US011886995B2

(12) United States Patent
Moskalev et al.

(10) Patent No.: US 11,886,995 B2
(45) Date of Patent: Jan. 30, 2024

(54) RECOGNITION OF OBJECTS IN IMAGES WITH EQUIVARIANCE OR INVARIANCE IN RELATION TO THE OBJECT SIZE

(71) Applicant: Robert Bosch GmbH, Stuttgart (DE)

(72) Inventors: Artem Moskalev, Amsterdam (NL); Ivan Sosnovik, Amsterdam (NL); Arnold Smeulders, Amsterdam (NL); Konrad Groh, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 235 days.

(21) Appl. No.: 17/360,709

(22) Filed: Jun. 28, 2021

(65) Prior Publication Data
US 2021/0406610 A1    Dec. 30, 2021

(30) Foreign Application Priority Data
Jun. 30, 2020 (DE) .......................... 102020208080.1

(51) Int. Cl.
*G06N 3/08* (2023.01)
*G06T 7/246* (2017.01)
(Continued)

(52) U.S. Cl.
CPC ............. *G06N 3/08* (2013.01); *G05D 1/0214* (2013.01); *G06F 18/213* (2023.01);
(Continued)

(58) Field of Classification Search
None
See application file for complete search history.

(56) References Cited

U.S. PATENT DOCUMENTS

| 10,955,855 B1* | 3/2021 | Tran ..................... G05D 1/0246 |
| 2018/0129742 A1* | 5/2018 | Li ........................... G06N 3/044 |
| 2021/0383209 A1* | 12/2021 | Brahma ................. G06V 10/82 |

FOREIGN PATENT DOCUMENTS

| DE | 102011005780 A1 | 9/2012 |
| DE | 102018210280 A1 | 1/2020 |
| WO | 2018089210 A1 | 5/2018 |

OTHER PUBLICATIONS

Ledesma, et al.: "Hermite Convolutional Networks", Iberoamerican Congress on Pattern Recognition CIARP (2019), LNCS 11896, Springer, CH, pp. 398-407. doi: 10.1007/978-3-030-33904-3_37.
(Continued)

*Primary Examiner* — Vikkram Bali
(74) *Attorney, Agent, or Firm* — NORTON ROSE FULBRIGHT US LLP; Gerard A. Messina

(57) ABSTRACT

A method for recognizing at least one object in at least one input image. In the method, a template image of the object is processed by a first convolutional neural network (CNN) to form at least one template feature map; the input image is processed by a second CNN to form at least one input feature map; the at least one template feature map is compared to the at least one input feature map; it is evaluated from the result of the comparison whether and possibly at which position the object is contained in the input image, the convolutional neural networks each containing multiple convolutional layers, and at least one of the convolutional layers being at least partially formed from at least two filters, which are convertible into one another by a scaling operation.

17 Claims, 6 Drawing Sheets

(51) Int. Cl.
*G05D 1/02* (2020.01)
*G06V 20/56* (2022.01)
*G06F 18/21* (2023.01)
*G06F 18/213* (2023.01)
*G06V 10/75* (2022.01)
*G06V 10/80* (2022.01)
*G06V 10/44* (2022.01)

(52) U.S. Cl.
CPC ............ *G06F 18/217* (2023.01); *G06T 7/248* (2017.01); *G06V 10/454* (2022.01); *G06V 10/757* (2022.01); *G06V 10/806* (2022.01); *G06V 20/56* (2022.01); *G05D 2201/0213* (2013.01); *G06T 2207/10016* (2013.01); *G06T 2207/20084* (2013.01); *G06T 2207/30252* (2013.01)

(56) References Cited

OTHER PUBLICATIONS

Marcos, et al.: "Scale equivariance in CNNs with vector fields", arXiv:1807.11783v, (2018), pp. 1-5, FAIM/ICML Workshop on Towards learning with limited labels . . . PMLR 80, 2018.

Murray, et al.: "Zoom In, Zoom Out: Injecting Scale Invariance into Landuse Classification CNNs", IGARSS (2019), 2019 IEEE—International Geoscience and Remote Sensing Symposium. IEEE, pp. 5240-5243; doi: 10.1109/IGARSS.2019.8900563.

Naderi, et al.: "Scale Equivariant CNNs with Scale Steerable ilters", 2020 International Conference on Machine Vision and Image Processing (MVIP), Iran, (2020), IEEE, 2020. pp. 1-5, doi: 10.1109/MVIP49855.2020.9116889.

Sosnovik, et al.: "Scale-Eequivariant Steerable Networks", arXiv:1910.11093, 2020. pp. 1-14, URL:https://arxiv.org/pdf/1910.11093).

\* cited by examiner

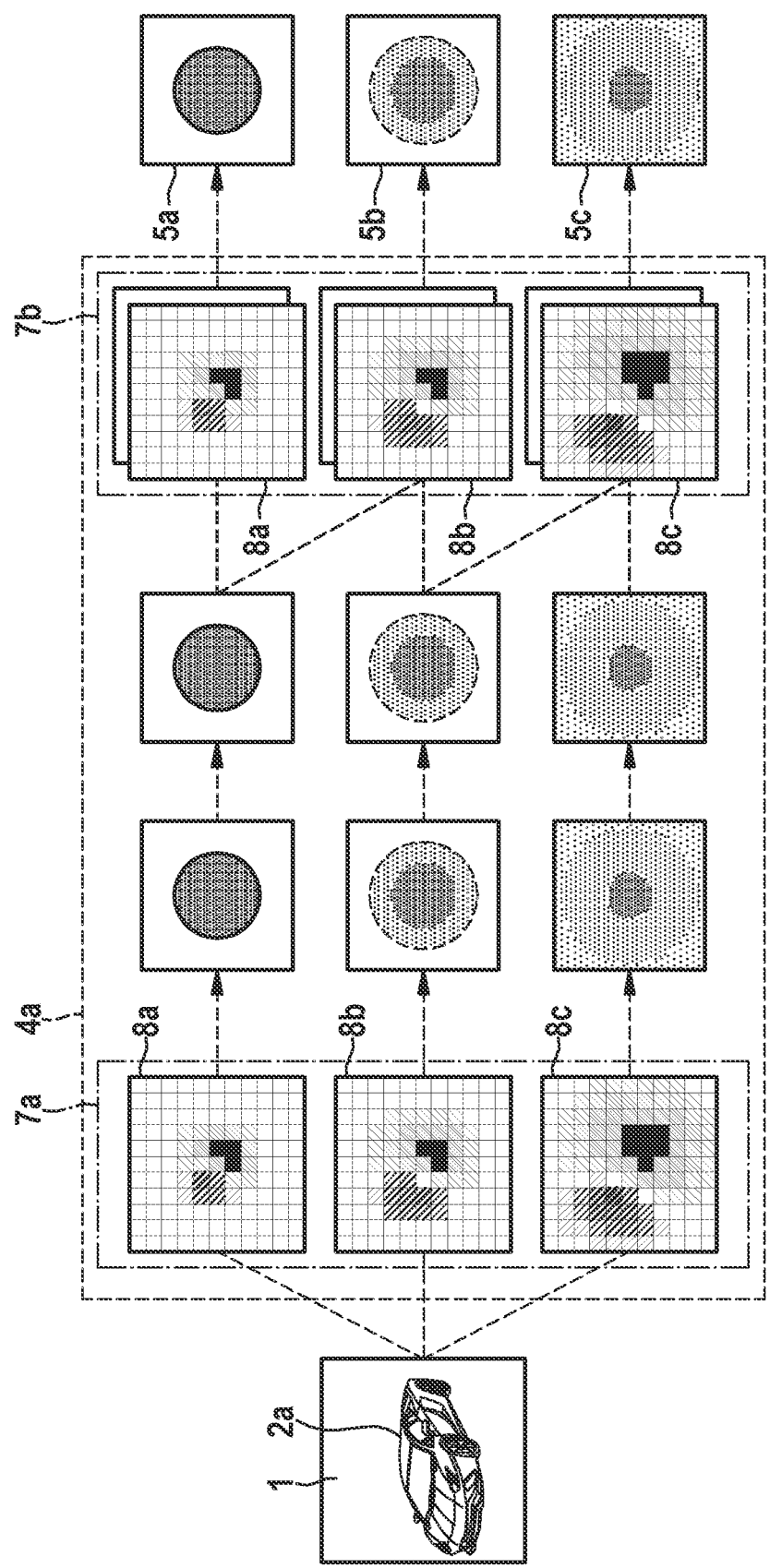

RECOGNITION OF OBJECTS IN IMAGES WITH EQUIVARIANCE OR INVARIANCE IN RELATION TO THE OBJECT SIZE

CROSS REFERENCE

The present application claims the benefit under 35 U.S.C. § 119 of German Patent Application No. DE 102020208080.1 filed on Jun. 30, 2020, which is expressly incorporated herein by reference in its entirety.

FIELD

The present invention relates to the recognition of objects in images, which is usable in particular for tracking a movement of these objects for driver assistance systems or at least semi-automated driving of vehicles.

BACKGROUND INFORMATION

Driver assistance systems, for example an electronic stability program, continuously sensorially observe the present driving situation and make decisions as to whether an intervention is made in the driving dynamics of the vehicle, for example by braking individual wheels. Systems for at least semi-automated driving of a vehicle continuously intervene in the driving dynamics and for this purpose plan multiple trajectories for a time period of a few seconds. One of these trajectories is then selected and negotiated on the basis of boundary conditions and optimality criteria and travel.

In mixed traffic including human road users, in particular these human road users and other moving objects may make short-term plan changes necessary. A method for adapting the trajectory of a vehicle to the behavior of moving foreign objects is described in German Patent Application No. DE 10 2018 210 280 A1.

SUMMARY

Within the scope of the present invention, a method for recognizing at least one object in at least one input image is provided.

In accordance with an example embodiment of the present invention, in this method, a template image of the object is processed by a first convolutional neural network (CNN) to form at least one template feature map ("feature map"). The input image is processed by a second convolutional neural network (CNN) to form at least one input feature map. Thus, the open question is not examined of which objects are contained in the input image, but rather it is deliberately searched as to whether a very specific object occurs in the input image.

In this case, the term "image" generally includes any association of values of at least one measured variable with locations in a two-dimensional or three-dimensional grid of location coordinates. Thus, for example, a camera measures an intensity of light or thermal radiation for each pixel of its image sensor. Similarly, an ultrasonic sensor measures a spatial distribution of the intensity and runtime of reflected ultrasonic waves. A radar sensor or LIDAR sensor measures the direction and distance of locations from which a radar beam or a laser beam, respectively, was reflected. The measured data of the mentioned measurement modalities are thus all to be viewed as images, this list not being exhaustive.

The at least one template feature map is compared according to an arbitrary metric to the at least one input feature map. It is evaluated from the result of the comparison whether and possibly at which position the object is contained in the input image.

This type of recognition is in particular advantageous for tracking the movement of the objects, also called "tracking." For this purpose, the object is sought in a chronological sequence of images, and the results as to whether and possibly at which position the object is contained in the input image are combined to form a tracking of the movement of the object. The specific object which is to be tracked may be established from the beginning, but may also be selected at the runtime from an input image, for example. The movements of multiple objects may also be tracked, for example, on the basis of the same chronological sequence of images, which show, for example, the kinematics of a traffic situation.

The convolutional neural network contains multiple convolutional layers. At least one of the convolutional layers is at least partially formed from at least two filters, which are convertible into one another by a scaling operation. Between three and five filters convertible into one another are particularly preferably provided. The greater the number of the filters convertible into one another is, the better the resolution is with which a size of the object in the input image may additionally be evaluated, but also the greater the memory requirement for the networks is.

The scaling operation which converts the filters into one another may relate to one, multiple, or all coordinate directions of the input image.

It has been found that the use of filters convertible into one another by scaling enables, in the search for the object, the search for a semantic correspondence to the object in the template image to be decoupled from the search for an object which is the same size as the object in the template image.

Without the filters convertible into one another, a correspondence found between the object in the template image and the input image is a dyad which is not separable further between the correspondence of the appearance ("semantic correspondence" for example of the shaping), on the one hand, and the correspondence of the dimension, on the other hand. Thus, for example, if the input image contains multiple objects of very different sizes and only a single one of these objects is of similar size to the object in the template image, solely this correspondence of the size in comparison of the template feature map to the input feature map may already have such a weight that the object of similar size in the input image is assessed as corresponding to the object sought in the template image. It is not necessarily an obstacle for this purpose that it is semantically a completely different object (for example a truck instead of a passenger vehicle).

In contrast, using the filters convertible into one another, it may be freely selected whether the feature maps output as a whole by the convolutional layers and by the convolutional neural networks are not to change in the event of size changes of objects in the images (in this case, the processing of the images is size-invariant) or whether these feature maps are to change in a predetermined way in the event of size changes of the objects in images (in this case, the processing of the images is size-equivariant).

Thus, for example, it may be reasonable that a driver assistance system or a system for at least semi-automated driving detects all occurrences of guideposts in the vehicle surroundings located ahead of the vehicle equivalently, because the guideposts indicate the course of the road and thus enable, for example, longer-term planning of the trajectory to be followed by the vehicle. Those guideposts which are closest to the vehicle appear substantially larger (by a factor of up to 10) in the input image supplied by the sensor system of the vehicle than those guideposts which are farthest away from the vehicle and are still just visible. To detect all guideposts, it is reasonable to process the images in a size-invariant manner.

In contrast, not all other road users (such as pedestrians or other vehicles) visible in the input image are necessarily relevant for the short-term trajectory planning, but rather only those road users who are close enough to the vehicle to be able to interact with the vehicle during the present planning horizon. The movement of another vehicle at a distance of 500 m, with which the ego vehicle could catch up in three minutes at a velocity difference of 10 km/h, does not have to be comprehended in detail for an exemplary planning horizon of 30 seconds. Thus, if the distance to objects is known, for example, the finite processing capacity available on board the vehicle for the accurate "tracking" of objects may be focused on those objects which are presently traffic-relevant for the vehicle.

The filters convertible into one another enable precisely this. In one particularly advantageous embodiment of the present invention, at least one convolutional neural network outputs multiple feature maps, in the creation of each of which one of the filters convertible into one another predominantly participates. For example, multiple layers of the convolutional neural network may each include the same constellation of filters convertible into one another, so that the pieces of information may each be processed separately on various size scales in these layers. Then, for example, upon the transition between the layers, the output of a specific filter from the constellation may preferably again be passed on to the filter corresponding thereto in the next layer. It is not precluded here that there are also cross connections between the size scales. However, for example, the filters convertible into one another in the last layer may each supply feature maps, in the processing of which in each layer essentially the same filter in the constellation was always participating. Thus, overall, feature maps of the image result for various size scales. The processing of the input image is size-equivariant.

These feature maps may advantageously be used separately for the comparison to one or multiple feature maps of the particular other image. The results of these comparisons may then be combined to form a piece of information about the size of the object in the input image.

For this purpose, for example, the size of the object in the input image may also be interpolated in particular between the size scales to which the filters in the constellation relate. For example, if a first filter relates to a size scale of 1, a second filter to a size scale of 2, and a third filter to a size scale of 3, a local correspondence established on the basis of the first feature map between the template image and the input image of 1 and a local correspondence of 0.2 established on the basis of the second feature map may be combined to form the estimation that the object is present in the input image having a size of approximately 1.2.

Quite a good estimation of the size of the object in the input image may thus already be ascertained using only a few filters.

A distance between a sensor used for the recording of the input image and the object may then in turn be evaluated from the ascertained size of the object in the input image and an at least approximately previously known absolute size of the object. This distance may be used, for example, to differentiate an object which is presently strongly traffic-relevant for a vehicle from objects which are less or not at all relevant.

For a size-invariant processing of the input image, in contrast, for example, feature maps supplied by the filters convertible into one another may be combined with a symmetrical function with respect to permutation of these feature maps. The result supplied by this function may subsequently be further processed in the particular convolutional neural network.

The size-invariant or size-equivariant processing of the input image is advantageous not only in the context of vehicle systems. It is also advantageous, for example, in the optical quality check of products manufactured in series if the recognition of flaws or damage functions as independently as possible of the distance of the camera from the particular product at the time of the image recording. In an access control system, which recognizes a person with authorized access on the basis of their face, the recognition at close range to the door to be opened is to be as independent as possible of precisely how close the person stands to the camera and thus how large they appear on the camera image.

Independently of whether the processing of the input image takes place in a size-equivariant or size-invariant manner, the at least one template feature map may in particular be compared, for example via a location-resolved correlation function, to the at least one input feature map. A position within the input image, at which this correlation function assumes a maximum (and/or exceeds a predefined threshold value), may be assessed as the position at which the object is contained in the input image.

In one particularly advantageous embodiment of the present invention, the convolutional neural networks have corresponding architectures, and their behavior is characterized by identical parameters. This implies that the filters convertible into one another by scaling are present not only in the one or the other network, but rather in both networks. Then, for example, the same convolutional neural network may always be used alternately for processing template images and input images, so that memory space for the parameters of a complete network is conserved. For example, if the movement of the same object in a sequence of new input images is always to be tracked over a longer time, the first convolutional neural network only has to be used a single time to process the input image to form a template feature map. During the ongoing tracking of the object in the sequence of input images, new input feature maps are created continuously using the second convolutional neural network, but the template feature map may be used again and again.

If the same object is sought in a chronological sequence of input images, the results as to whether and possibly at which position the object is contained in the input image may be combined to form a tracking of the movement of the object. This information may be used in particular in driver assistance systems or systems for at least semi-automated driving of a vehicle for planning the future behavior of the vehicle. Therefore, in one particularly advantageous embodiment, the input images are detected using at least one sensor carried along by a vehicle. The ascertained movement and/or an ascertained movement intention of the object is used by a driver assistance system of the vehicle and/or by a system for the at least semi-automated driving of the vehicle for planning a trajectory to be negotiated by the vehicle and/or for establishing an intervention in the driving dynamics of the vehicle.

For this purpose, the information as to whether and possibly at which position the object is contained in the input image may be provided in particular, for example, in the form of "bounding boxes" the in two-dimensional or three-dimensional space, which are considered to be occupied by the object.

The movement intention may in particular include a prognosis, for example, as to whether the object will maintain its present movement state or to what extent this movement state will presumably change within a predefined time horizon. In the case of solely passive, noncontrolled objects, such as a lost piece of cargo, the movement intention may essentially be predicted on the basis of physical laws. In contrast, vehicles and pedestrians are controlled by the will of the particular road user. In one particularly advantageous embodiment, a prognosis for this suspected will and thus for a movement intention of the object is ascertained from a course over time of the ascertained position of the object in the input image and from a course over time of the ascertained size and/or the distance of the object.

As explained above, in particular the distance of the object from the vehicle may be important for the extent to which the object is traffic-relevant for the behavior of the vehicle in the immediate future. Therefore, in another advantageous embodiment, it is decided on the basis of an ascertained distance between the sensor and the object whether a course over time of the position of an object is evaluated in a sequence of input images and/or to what extent this object is relevant for the present traffic situation of the vehicle. The processing capacity available on board the vehicle is frequently not sufficient to actually track every object which is visible in the vehicle surroundings. The situation is approximately comparable to the learning of driving by a human student driver, who also has to learn to distribute an available total amount of attention to the most important objects.

The filters convertible into one another may in particular, for example, be linear combinations made up of base functions of a function space with free coefficients. These coefficients may be jointly trained at least partially using the other parameters which characterize the behavior of the convolutional neural network. In this context, for example, in particular parameters which characterize the behavior of the filters convertible into one another may contain, in addition to the coefficients of the linear combinations, still further parameters which characterize at least one geometric transformation of the filters. For example, these parameters may characterize a rotation of the filters.

In accordance with an example embodiment of the present invention, the method may in particular be entirely or partially computer-implemented. Therefore, the present invention also relates to a computer program including machine-readable instructions which, when they are executed on one or multiple computers, prompt the computer or computers to carry out the method. Control units for vehicles and embedded systems for technical devices which are also capable of executing machine-readable instructions are also to be considered computers in this meaning.

The present invention also relates to a machine-readable data medium and/or to a download product including the computer program. A download product is a digital product transferable via a data network, i.e., downloadable by a user of the data network, which may be offered for sale, for example, in an online shop for immediate download.

Furthermore, a computer may be equipped with the computer program, the machine-readable data medium, or the download product.

Further measures which improve the present invention are described in greater detail hereinafter together with the description of the preferred exemplary embodiments of the present invention on the basis of the figures.

BRIEF DESCRIPTION OF THE DRAWINGS

FIG. 2a-2c show a compilation of filters 8a-8c convertible into one another by scaling made up of base functions 9 and effect of these filters 8a-8c in a convolutional neural network 4a, in accordance with an example embodiment of the present invention.

FIGS. 3a-3c show an effect of filters 8a-8c convertible into one another in neural networks 4a, 4b on the recognition of an object 2a.

DETAILED DESCRIPTION OF EXAMPLE EMBODIMENTS

Figure 1:
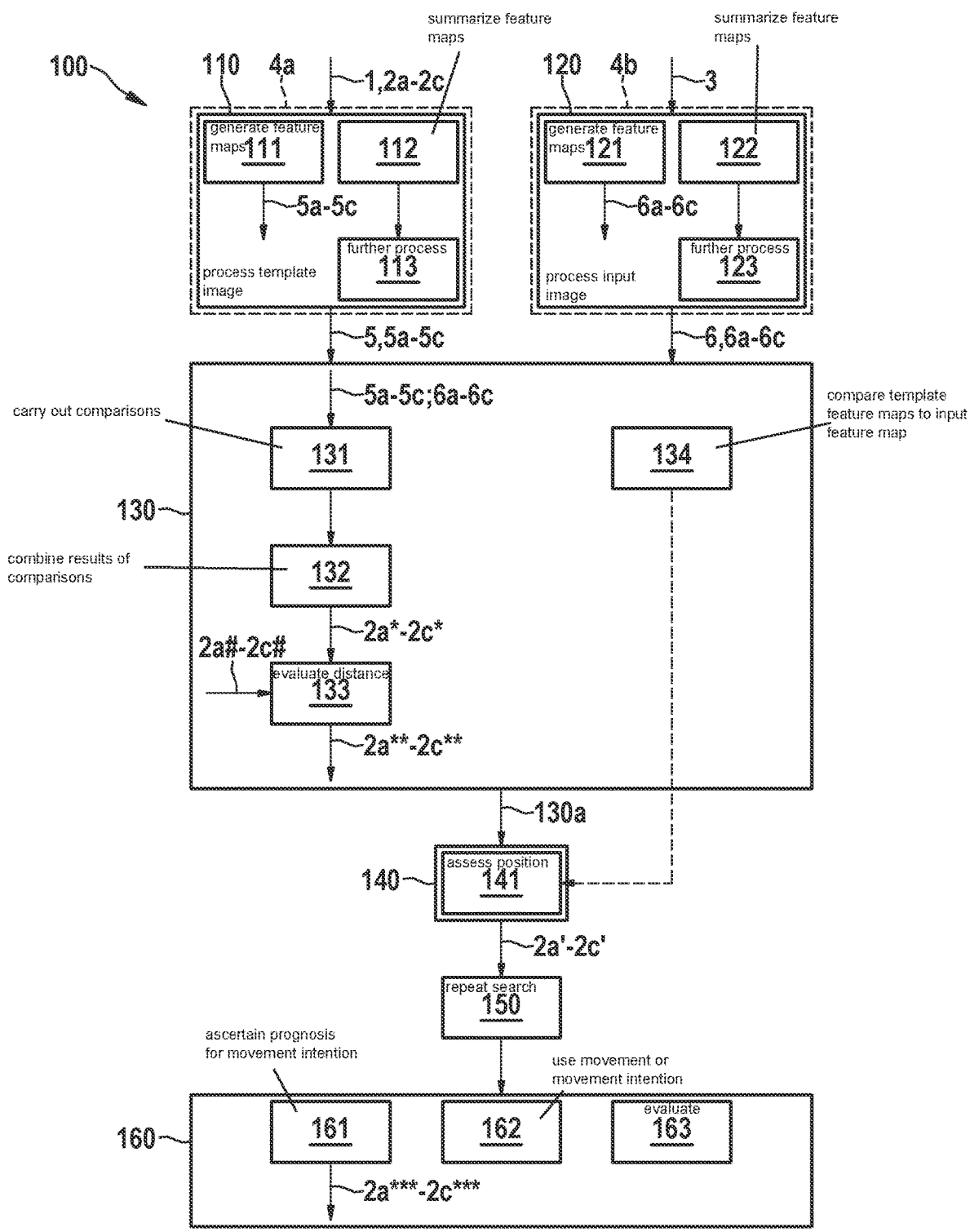
FIG. 1 shows an exemplary embodiment of method 100 for recognizing at least one object 2a-2c in at least one input image 3, in accordance with the present invention.

FIG. 1 is a schematic flowchart of an exemplary embodiment of method 100 for recognizing at least one object 2a-2c in at least one input image 3.

In step 110, a template image 1 of object 2a-2c to be recognized is processed by a first convolutional neural network, CNN 4a, to form at least one template feature map 5, 5a-5c. In step 120, input image 3 is processed by a second convolutional neural network, CNN 4b, to form at least one input feature map 6, 6a-6c. Convolutional neural networks 4a, 4b each contain multiple convolutional layers 7a, 7b. At least one of convolutional layers 7a, 7b is at least partially formed from at least two filters 8a-8c, which are convertible into one another by a scaling operation.

In this case, in particular according to block 111 or 121, multiple feature maps 5a-5c or 6a-6c, respectively, may be generated, in the creation of which one of filters 8a-8c predominantly participates in each case.

Alternatively, according to block 112 or 122, feature maps which were supplied by filters 8a-8c convertible into one another may be summarized (combined) using a function symmetrical against permutation of these feature maps. According to block 113 or 123, the result may be further processed in particular convolutional neural network 4a, 4b.

In step 130, the at least one template feature map 5, 5a-5c is compared to the at least one input feature map 6, 6a-6c. It is then evaluated in step 140 from result 130a of this comparison 130 whether and possibly at which position 2a'-2c' object 2a-2c is contained in input image 3.

Comparison 130 may in particular, for example, according to block 131, be carried out separately for multiple feature maps 5a-5c; 6a-6c. The results of these comparisons may then be combined according to block 132 to form a piece of information about size 2a*-2c* of object 2a-2c in input image 3. From this size 2a*-2c* and a previously known absolute size 2a#-2c# of object 2a-2c, according to block 133, a distance 2a-2c between a sensor used for recording input image 3 and object 2a-2c may in turn be evaluated.

In general, according to block 134, the at least one template feature map 5, 5a-5c may be compared via a location-result correlation function to the at least one input feature map 6, 6a-6c. Then, for example, according to block 141, a position at which this correlation function assumes a maximum and/or exceeds a predefined threshold value, may be assessed as position $2a'$-$2c'$, at which object $2a$-$2c$ is contained in input image 3.

Object $2a$-$2c$ may in particular be sought in a chronological sequence of input images 3. In step 150, the above-described search may thus be repeated in further input images 3. In step 160, the results as to whether and possibly at which position $2a'$-$2c'$ object $2a$-$2c$ is contained in input image 3 may be combined to form a tracking of movement $2a''$-$2c''$ of object $2a$-$2c$.

For example, according to block 161, a prognosis for a movement intention $2a^{*}$-$2c^{*}$ of object $2a$-$2c$ may be ascertained from a course over time of ascertained position $2a'$-$2c'$ of object $2a$-$2c$ in input image 3 and from a course over time of ascertained size $2a^*$-$2c^*$ and/or distance $2a^{}$-$2c^{}$ of object $2a$-$2c$.

The input images may be acquired in particular, for example, using at least one sensor carried along by a vehicle. Then, according to block 162, ascertained movement $2a''$-$2c''$ and/or ascertained movement intention $2a^{*}$-$2c^{*}$ of object $2a$-$2c$ may be used by a driver assistance system of the vehicle and/or by a system for at least semi-automated driving of the vehicle for planning a trajectory to be negotiated by the vehicle and/or for establishing an intervention in the driving dynamics of the vehicle.

According to block 163, it may be decided on the basis of an ascertained distance $2a^{}$-$2c^{}$ between the sensor and object $2a$-$2c$ whether a course over time of position $2a'$-$2c'$ of an object $2a$-$2c$ is evaluated in a sequence of input images 3 and/or to what extent this object $2a$-$2c$ is relevant for the present traffic situation of the vehicle. As explained above, the resources for further processing may thus be focused on the most important objects.

Figure 2A:
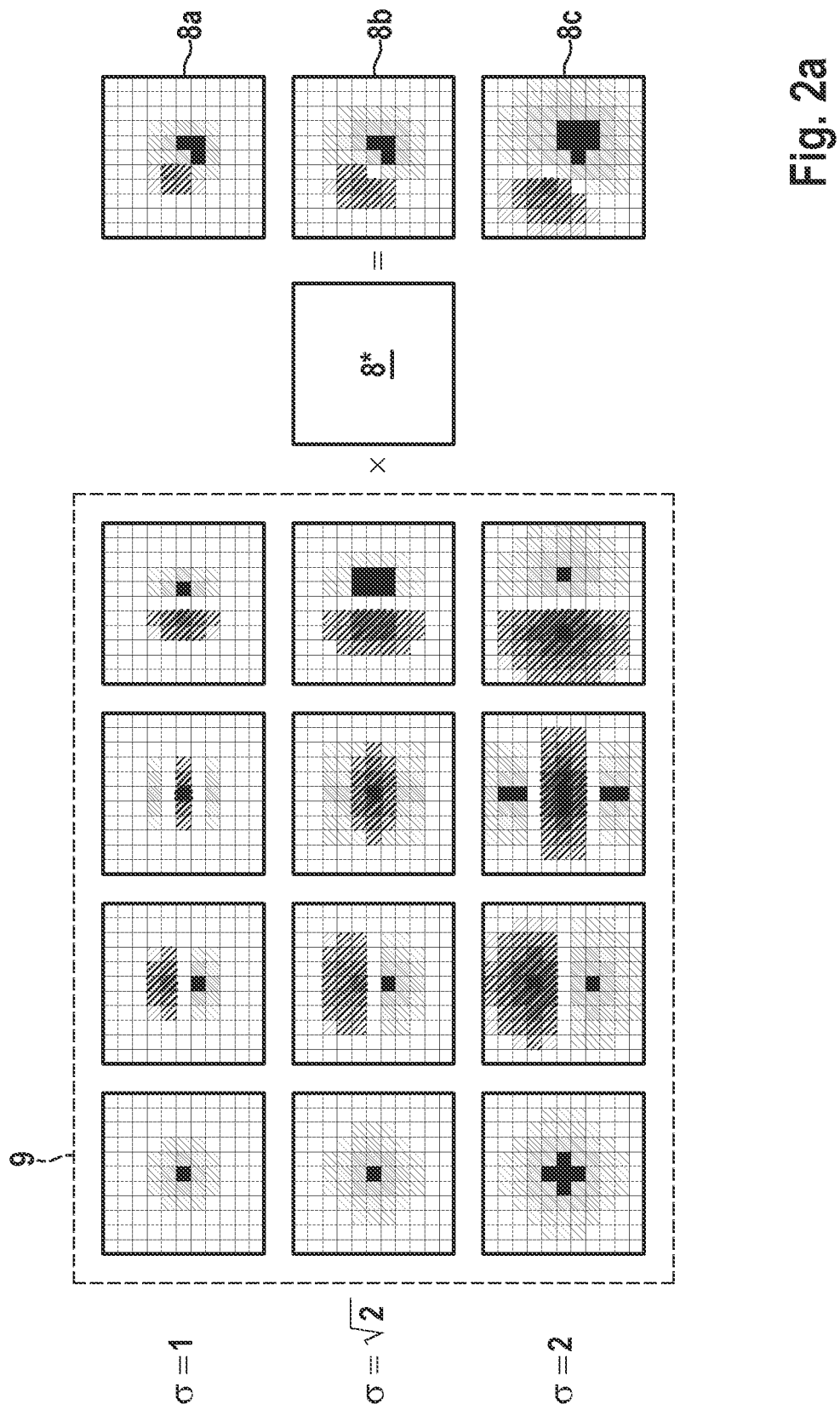

FIG. 2a shows by way of example how three filters $8a$-$8c$, which are convertible into one another by scaling operations, may be generated from base functions 9 on three size scales $\sigma=1$, $\sigma=\sqrt{2}$, and $\sigma=2$ on the basis of parameters $8^*$.

Figure 2B:
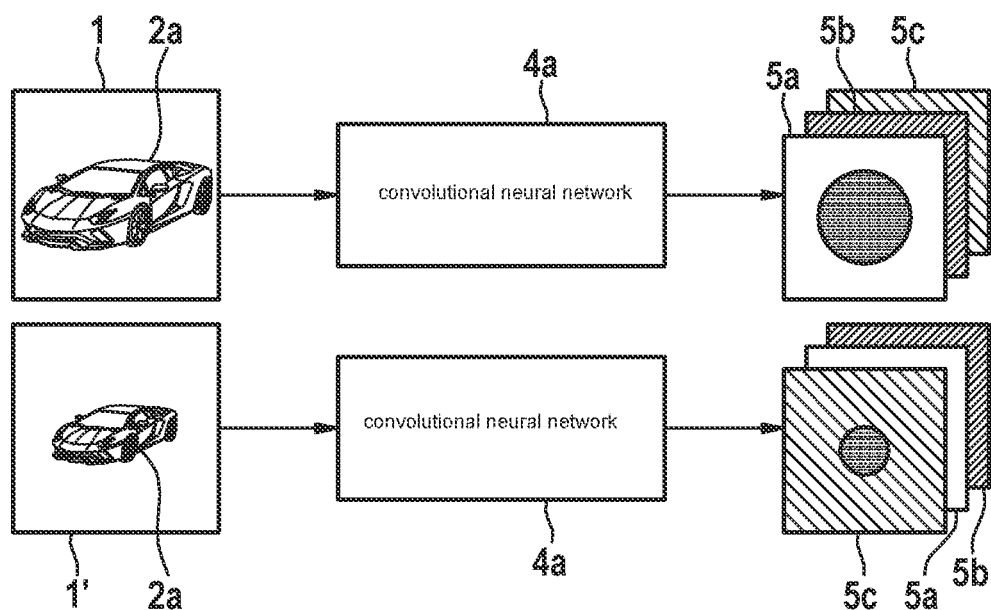

FIG. 2b shows by way of example the effect it has when these filters $8a$-$8c$ are applied in a convolutional neural network $4a$ to a template image 1 of an object $2a$ and to a shrunken version $1'$ of this template image 1. In this example, template image 1 generates a large response on first feature map $5a$, in the creation of which filter $8a$ for largest size scale $\sigma=2$ predominantly participates. Shrunken version $1'$ generates a qualitatively similar, but quantitatively significantly smaller response, and does so not only on feature map $5a$, but on feature map $5c$, in the creation of which filter $8c$ for smallest size scale $\sigma=1$ predominantly participates. The processing of template image 1 by convolutional neural network $4a$ is thus equivariant, i.e., the result changes in a predictable way with the change of the size of object $2a$ in template image 1.

FIG. 2c illustrates in detail how convolutional neural network $4a$ including two convolutional layers $7a$ and $7b$, in each of which filters $8a$-$8c$ are used, processes the results shown in FIG. 2b for template image 1. The information processed in first convolutional layer $7a$ on one of the three size scales is essentially passed on at the same size scale in second convolutional layer $7b$. However, there are also cross connections to the particular next smaller size scale, if present.

Figure 3A:
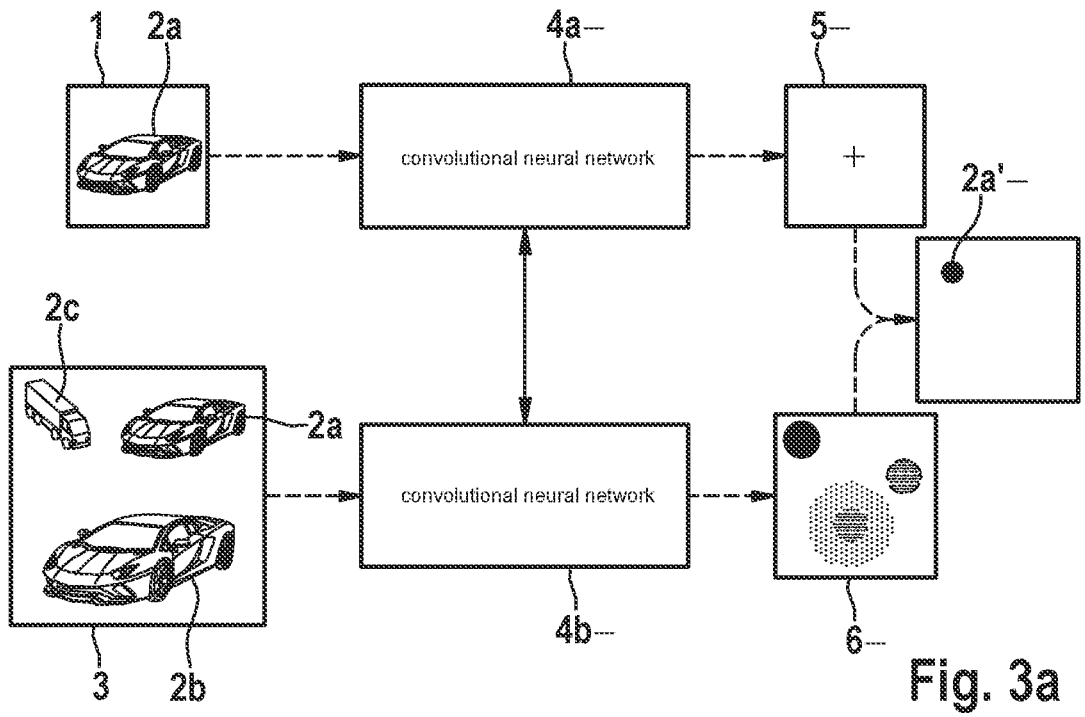
Figure 3B:
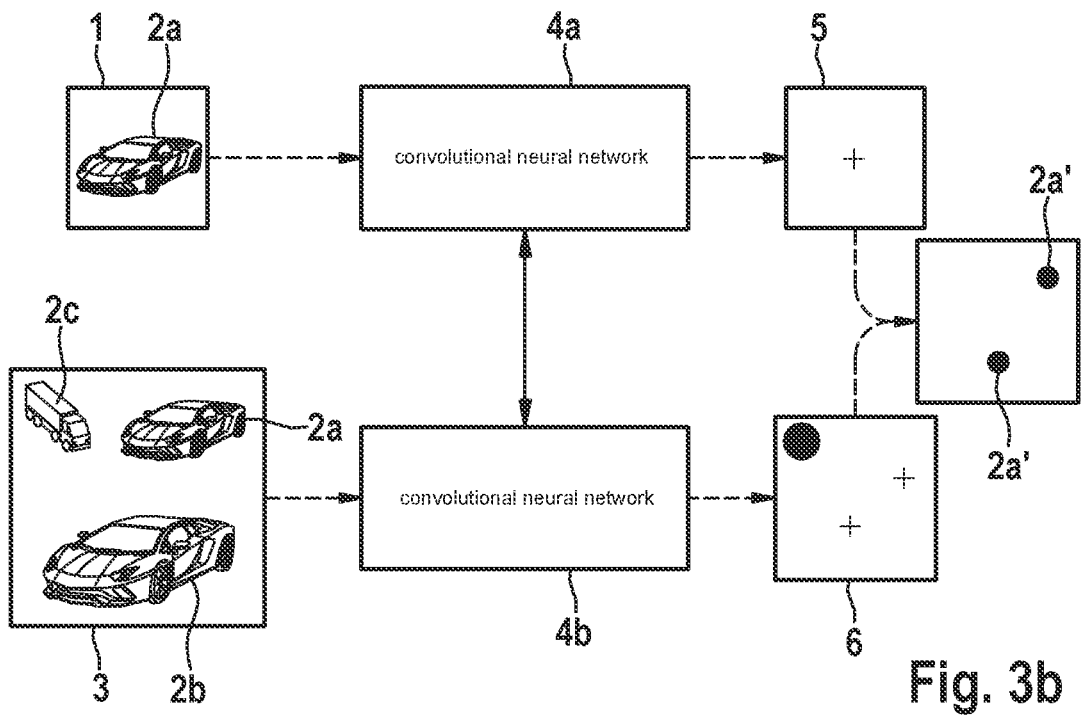
Figure 3C:
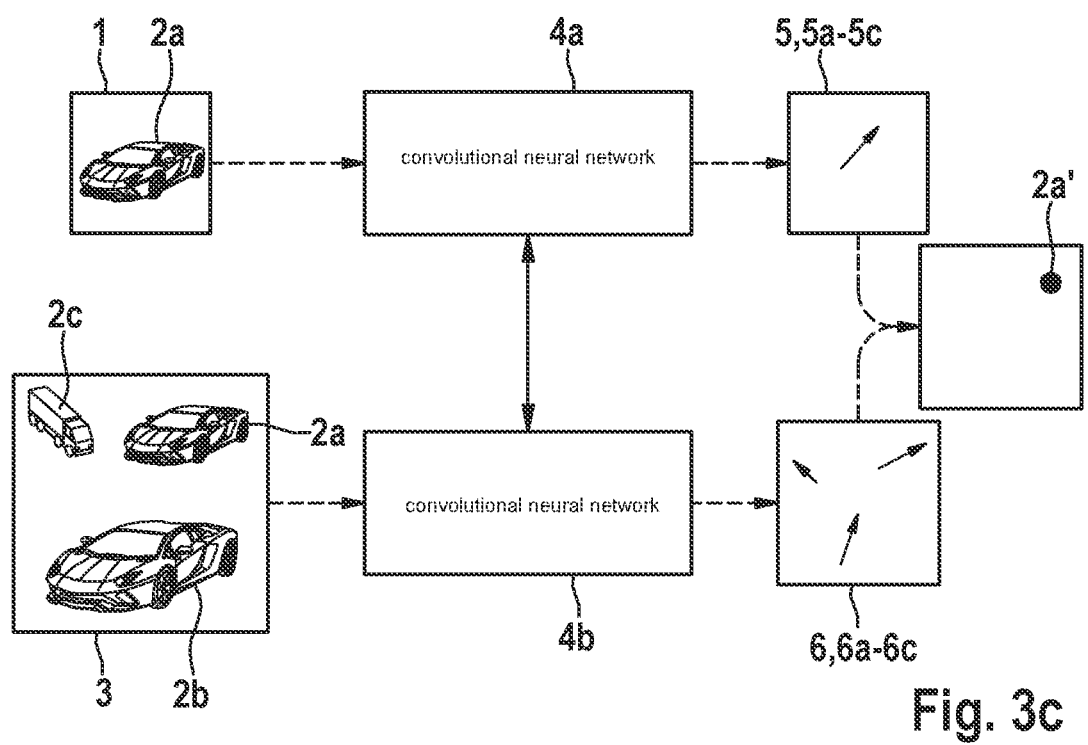

FIG. 3a-3c show how the processing of images using convolutional neural networks $4a$, $4b$, in which filters $8a$-$8c$ convertible into one another by scaling are used, affects the recognition of an object $2a$ in an input image 3.

For comparison, FIG. 3a shows the processing according to the related art. Template image 1, which shows only one passenger vehicle as object $2a$, is processed using first convolutional neural network $4a$- to form a feature map 5. Input image 3 also shows, in addition to this passenger vehicle $2a$, a greatly enlarged copy $2b$ thereof and a truck $2c$. Input image 3 is processed using second convolutional neural network $4b$- to form a feature map 6. Convolutional neural networks $4a$ and $4b$ lack filters $8a$-$8c$ convertible into one another by scaling.

The comparison of feature maps 5 and 6 with the aid of cross correlation shows a strong correspondence only in the top left corner of input image 3, where truck $2c$ is imaged in approximately the same size as passenger vehicle $2a$ in template image 1. Therefore, passenger vehicle $2a$ is recognized at incorrect position $2a'$.

FIG. 3b shows the processing using convolutional neural networks $4a$ and $4b$, which contain filters $8a$-$8c$ convertible into one another by scaling. In this example, the feature maps supplied by filters $8a$-$8c$ convertible into one another are combined using a symmetrical function, and subsequently only the result of this combination is further processed. The processing of template image 1 and input image 3 is thus size-invariant.

This has the effect that not only passenger vehicle $2a$ on the top right in input image $2a$, but also its significantly larger copy $2b$ in the bottom half of input image 3, is recognized as passenger vehicle $2a$. Thus, two positions $2a'$ of passenger vehicle $2a$ are recognized, the strongly differing sizes remaining unconsidered.

FIG. 3c shows, in contrast thereto, what effect it has when the feature maps generated by filters $8a$-$8c$ convertible into one another are not combined, but propagated similarly to FIG. 2c through convolutional neural network $4a$, $4b$. First convolutional neural network $4a$ then supplies multiple template feature maps $5a$-$5c$, and second convolutional neural network $4b$ supplies multiple input feature maps $6a$-$6c$. Separate comparisons of these feature maps $5a$-$5c$, $6a$-$6c$ then have the result that only passenger vehicle $2a$ on the top right in input image 3 matches both with respect to the shape and also the size to template image 1. Accordingly, only a position $2a'$ of passenger vehicle $2a$ is output.

What is claimed is:

1. A method for recognizing at least one object in at least one input image, comprising the following steps:
processing a template image of the object by a first convolutional neural network to form at least one template feature map;
processing the input image by a second convolutional neural network to form at least one input feature map;
comparing the at least one template feature map to the at least one input feature map; and
evaluating, from a result of the comparison whether the object is contained in the input image;
wherein the first and second convolutional neural networks each contain multiple convolutional layers, and at least one of the convolutional layers is at least partially formed from at least two filters, which are convertible into one another by a scaling operation, and
the first and second convolutional neural networks each output multiple feature maps for the template image and the input image, respectively, and in the creation of each of the multiple feature maps a different one of the filters convertible into one another predominantly participates.

2. The method as recited in claim 1, wherein the evaluating includes evaluating the result of the comparison at what position the object is contained in the image.

3. The method as recited in claim 1, wherein the comparison is carried out separately for each of the multiple feature maps, and results of the comparisons are combined to form a piece of information about a size of the object in the input image.

4. The method as recited in claim 3, wherein a distance between a sensor used for recording of the input image and the object is evaluated from the size of the object in the input image and a previously known absolute size of the object.

5. The method as recited in claim 1, wherein feature maps supplied by the filters convertible into one another are combined using a function symmetrical with respect to permutation of these feature maps, and a result is subsequently further processed in a respective one of the first and second convolutional neural networks.

6. The method as recited in claim 1, wherein the at least one template feature map is compared via a location-resolved correlation function to the at least one input feature map and a position at which the correlation function assumes a maximum is assessed as a position at which the object is contained in the input image.

7. The method as recited in claim 1, wherein the first and second convolutional neural networks have corresponding architectures and their behavior is characterized by identical parameters.

8. The method as recited in claim 4, wherein the object is sought in a chronological sequence of input images, and results as to whether the object is contained in the input image are combined to form a tracking of the movement of the object.

9. The method as recited in claim 4, wherein the object is sought in a chronological sequence of input images, and results as to whether and at which position the object is contained in each of the input images are combined to form a tracking of the movement of the object.

10. The method as recited in claim 9, wherein a prognosis for a movement intention of the object is ascertained from a course over time of the ascertained position of the object in the input image and from a course over time of the ascertained size and/or distance of the object.

11. The method as recited in claim 10, wherein the input images are detected using at least one sensor carried along by a vehicle, and the ascertained movement and/or the ascertained movement intention of the object is used, by a driver assistance system of the vehicle and/or by a system for at least semi-automated driving of the vehicle, for planning a trajectory to be negotiated by the vehicle and/or for establishing an intervention in driving dynamics of the vehicle.

12. The method as recited in claim 11, wherein it is decided based on an ascertained distance between the sensor and the object whether a course over time of a position of the object in the sequence of input images is evaluated and/or to what extent the object is relevant for a present traffic situation of the vehicle.

13. The method as recited in claim 1, wherein the filters convertible into one another are linear combinations made up of base functions of a function space with free coefficients.

14. The method as recited in claim 13, wherein the base functions are Hermite polynomials.

15. The method as recited in claim 13, wherein parameters which characterize behavior of the filters convertible into one another contain, in addition to the coefficients of the linear combinations, still further parameters which characterize the at least one geometric transformation of the filters.

16. A non-transitory machine-readable data medium on which is stored a computer program configured to recognize at least one object in at least one input image, the computer program, when executed by at least one computer, causing the at least one computer to perform the following steps:
processing a template image of the object by a first convolutional neural network to form at least one template feature map;
processing the input image by a second convolutional neural network to form at least one input feature map;
comparing the at least one template feature map to the at least one input feature map; and
evaluating, from a result of the comparison whether the object is contained in the input image;
wherein the first and second convolutional neural networks each contain multiple convolutional layers, and at least one of the convolutional layers is at least partially formed from at least two filters, which are convertible into one another by a scaling operation, and
the first and second convolutional neural networks each output multiple feature maps for the template image and the input image, respectively, and in the creation of each of the multiple feature maps a different one of the filters convertible into one another predominantly participates.

17. A computer configured to recognize at least one object in at least one input image, the computer configured to:
process a template image of the object by a first convolutional neural network to form at least one template feature map;
process the input image by a second convolutional neural network to form at least one input feature map;
compare the at least one template feature map to the at least one input feature map; and
evaluate, from a result of the comparison whether the object is contained in the input image;
wherein the first and second convolutional neural networks each contain multiple convolutional layers, and at least one of the convolutional layers is at least partially formed from at least two filters, which are convertible into one another by a scaling operation, and
the first and second convolutional neural networks each output multiple feature maps for the template image and the input image, respectively, and in the creation of each of the multiple feature maps a different one of the filters convertible into one another predominantly participates.

* * * * *